(12) United States Patent
Fang et al.

(10) Patent No.: US 9,514,289 B2
(45) Date of Patent: Dec. 6, 2016

(54) LICENSE MANAGEMENT METHODS

(71) Applicant: Quanta Computer Inc., Kuei Shan Hsiang, Tao Yuan Shien (TW)

(72) Inventors: Tien-Chin Fang, Tao Yuan Shien (TW); Chen-Chung Lee, Tao Yuan Shien (TW); Ping-Chi Lai, Tao Yuan Shien (TW); Chia-Hung Lin, Tao Yuan Shien (TW); Ming-Jen Chen, Tao Yuan Shien (TW); Hung-Yu Yang, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 35 days.

(21) Appl. No.: 14/582,672

(22) Filed: Dec. 24, 2014

(65) Prior Publication Data

US 2016/0063222 A1    Mar. 3, 2016

(30) Foreign Application Priority Data

Aug. 26, 2014   (TW) .............................. 103129300 A

(51) Int. Cl.
*G06F 7/04* (2006.01)
*G06F 21/10* (2013.01)

(52) U.S. Cl.
CPC .................................. *G06F 21/105* (2013.01)

(58) Field of Classification Search
CPC ...... G06F 21/105; G06F 21/10; G06F 21/31; G06F 21/6218
See application file for complete search history.

(56) References Cited

U.S. PATENT DOCUMENTS

| 5,606,399 | A | 2/1997 | Kikui | |
|---|---|---|---|---|
| 7,865,444 | B1* | 1/2011 | Biswas | G06F 21/105 705/51 |
| 2003/0072448 | A1* | 4/2003 | Nakamura | G06F 21/10 380/243 |
| 2007/0179899 | A1* | 8/2007 | Hase | G06Q 10/10 705/59 |
| 2011/0010216 | A1* | 1/2011 | Bhogal | G06F 21/105 705/7.31 |

FOREIGN PATENT DOCUMENTS

| CN | 1139224 | 2/2004 |
|---|---|---|
| CN | 102780709 | 11/2012 |

OTHER PUBLICATIONS

Chinese language office action dated Aug. 20, 2015, issued in application No. TW 103129300.

* cited by examiner

Primary Examiner — Fatoumata Traore
Assistant Examiner — Carlton Johnson
(74) *Attorney, Agent, or Firm* — McClure, Qualey & Rodack, LLP

(57) ABSTRACT

License management methods for use in a license management system are provided. The license management system includes licenses and first devices, each of which obtains one of the licenses. First, a license request from a second device is received and a license grade for each of the first devices and the second device is separately calculated based on a historical record of license usage corresponding to the first devices and the second device and an algorithm in response to the license request. Then, whether to agree the second device to obtain one of the licenses is determined according to the calculated grades and the number of remaining available licenses within the licenses.

7 Claims, 3 Drawing Sheets

LICENSE MANAGEMENT METHODS

CROSS REFERENCE TO RELATED APPLICATIONS

This application claims priority of Taiwan Application No. 103129300, filed on Aug. 26, 2014, and the entirety of which is incorporated by reference herein.

BACKGROUND OF THE INVENTION

Field of the Invention

The invention generally relates to license management systems and related methods, and more particularly, to license management systems and related license management methods thereof capable of managing the obtaining and releasing of a given number of licenses.

Description of the Related Art

License distribution is used to manage a variety of licenses, such as the obtaining and releasing of a software license, to distribute limited number of licenses to be used by multiple users or devices. Traditionally, there are two kinds of the license distribution mechanisms. The first mechanism does not limit the number of licenses that each group can use, so those who require licenses from the server first will obtain the licenses first. However, such mechanism may make the licenses cannot be evenly distributed and used. The second mechanism limits the number of licenses that each group can use, so the licenses can be evenly distributed and used by pre-setting the maximum number of licenses that each group can use. However, the remaining licenses of each group cannot be effectively utilized.

In addition, when the license server is fully loaded, there is no license that can be used. As users request licenses, they will only get a wrong message indicating that the number of licenses is insufficient and cannot know when they can obtain licenses. They may need to always try to manually request licenses, thus wasting of time and manpower.

BRIEF SUMMARY OF THE INVENTION

Accordingly, embodiments of the invention provide license management systems and related license management methods thereof for managing the obtaining and releasing of a given number of licenses. In one aspect of the invention, license management methods for use in a license management system are provided. The license management system includes licenses and first devices, each of which obtains one of the licenses. The method comprises the following steps. First, a license request from a second device is received and a license grade for each of the first device and the second device is separately calculated based on a historical record of license usage corresponding to the first devices and the second device and an algorithm in response to the license request. Then, whether to agree the second device to obtain one of the licenses is determined according to the calculated grades and the number of remaining available licenses within the licenses.

In another aspect of the invention, a license management system for managing a plurality of licenses is provided which comprises a plurality of first devices, a grade calculation device and a scheduling device. Each of the first devices obtains one of the licenses. The grade calculation device separately calculates a license grade for each of the first devices and the second device based on a historical record of license usage corresponding to the first devices and the second device and an algorithm in response to a license request from a second device. The scheduling device determines whether to agree the second device to obtain one of the licenses is determined according to the calculated grades and the number of remaining available licenses within the licenses.

Other aspects and features of the present invention will become apparent to those with ordinarily skill in the art upon review of the following descriptions of specific embodiments of license management methods for use in a license management system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Embodiments of the invention provide license management systems and related license management methods thereof, to manage the way of obtaining and releasing a license. An algorithm is used to calculate the rating of all licensed users or devices, take the past use statuses of groups and individuals into consideration, and calculate the average usage rate of each group and individual when the license server is fully loaded, to release firstly the licenses of groups and users with higher usage rates, so as to achieve the equality among all groups using all the licenses fairly and effectively.

Figure 1:
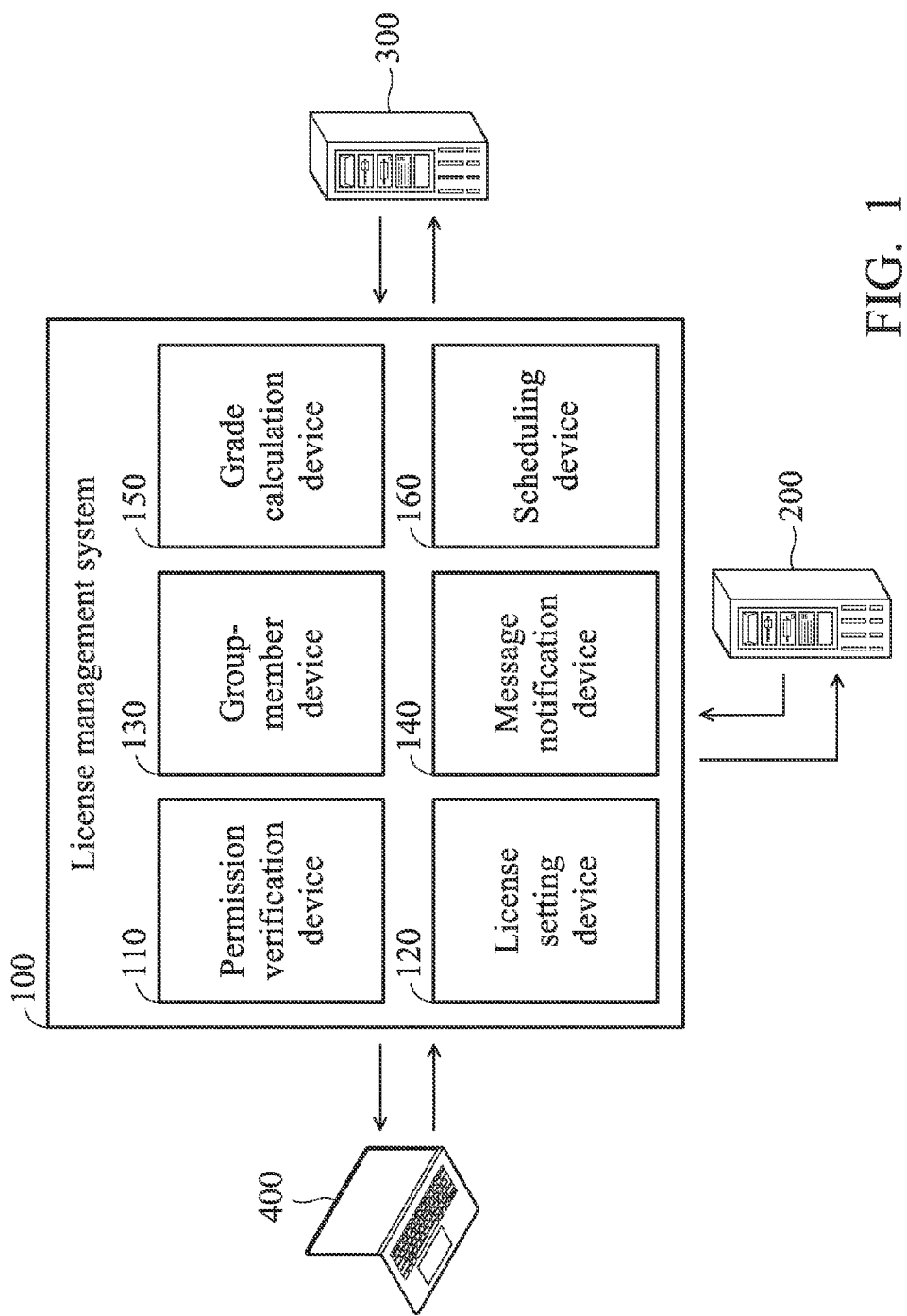
FIG. 1 is a schematic diagram illustrating an embodiment of a license management system of the invention.

FIG. 1 is a schematic diagram illustrating an embodiment of a license management system of the invention. The license management system 100 of the invention can be an electronic device, such as a PDA (Personal Digital Assistant), a smart phone, a mobile phone, an MID (Mobile Internet Device, MID), a laptop computer, a car computer, a digital camera, a multi-media player, a game device, or any other type of mobile computational device, however, it is to be understood that the invention is not limited thereto. The license management system 100 may be further coupled to one or more servers, such as a license server 200 and a data server 300 for performing license management. For example, the license management system 100 may be coupled to the license server 200 and the data server 300 via, any wired/wireless communications networks, such as the INTERNET, 3G, and/or WLAN network, blue-tooth network and so on) to perform communication and data transmission therebetween. The license server 200 may include a license pool, in which a given number of licenses can be distributed and the relevant data can be recorded, such as a list of licensed users currently using the licenses, a VIP list, a list of users with permissions and the regulations related to licenses and so on. The data server 300 may include user-related data and the historical records of the use of its licenses, such as the list of all users and data, the record of the use of licenses and the record of license reservations. The license management system 100 may communicate with the license server 200 and the data server 300 to receive the license requests from one or more devices 400, and manage the obtaining and releasing of the licenses in the license pool of the license server 200 based on the license management method of the invention. Each device 400 corresponds to a user. When the user of a device 400 is a licensed user who is using the license currently, the device 400 can also be referred to a license usage device. When the user of a device 400 is a license requester who is requesting the using of the license, the device 400 can also be referred to a license request device. When the user of a device 400 is a license to-be-released user who is being requested to release the license, the device 400 can also be referred to a license to-be-released device.

The license management system 100 may at least comprise a permission verification device 110, a license setting device 120, a group-member device 130, a message notification device 140, a grade calculation device 150, and a scheduling device 160. The permission verification device 110 is used to perform a verification process for permissions, to determine whether a license request device has the permission to obtain the license. For example, the permission check on the license request device may include checking the following conditions: whether the user of the device has ever applied for using this software, whether the user of the device is set as a VIP of the license of this software, whether the total hours the user of the device spends on this software on the day has reached an upper limit, whether the total hours the user of the device spends on this software in the current week has reached an upper limit, and whether the total hours the user of the device spends on this software in the current month has reached an upper limit. The license setting device 120 may be configured to set the license-related information in the license server 200, such as the VIP list, the list of users with permissions and regulations related to licenses and so on. While performing the license management, the group-member device 130 may obtain the list of groups, the data related to the users of each group's devices, and the historical records of their license usages from the data server 300, such as the list of and data on all the users of group devices, the record of license usages, and the record of license reservations, and provide the group-related data to the grade calculation device 150.

The grade calculation device 150 may perform a license grade calculation based on an algorithm, comprehensively consider the past use conditions of the groups and each device and the historical records of license usages by groups, calculate the grades of the users of all the current license usage devices, the grades of the users of license reservation devices, and the grades of the users of license request devices. The message notification device 140 may send/issue a notice message, such as a license reject notice, an expected license recovery notice, or an expected license grant notice and so on, to the license request device to notify the users of the license request devices whether their license request can be accepted and/or when the license can be used. The scheduling device 160 may re-distribute the licenses according to the grade calculated by the grade calculation device 150. The scheduling device 160 may further determine the order of priority for the license usage of different devices based on the calculated grade. The higher the grade is, the lower the order of priority is, so that the licenses can be re-distributed. For example, the scheduling device 160 may periodically re-organize license services and reject the license request of a user of the license request device based on the grades, request the user of the license usage device that is currently using the license to release his/her license, or arrange the license usage time for a user of the license request device and so on.

It is understand that the permission verification device 110, the license setting device 120, the group-member device 130, the message notification device 140, the grade calculation device 150 and the scheduling device 160 can be implemented by hardware, software or a combination thereof. For example, the permission verification device 110, the license setting device 120, the group-member device 130, the message notification device 140, the grade calculation device 150 and the scheduling device 160 can respectively comprise suitable hardware circuits and software program codes to complete respective operations In some embodiments, the license management system 100 may further comprise a storage unit (e.g. a high-speed random access memory (e.g. SRAM or DRAM) and/or non-volatile memory, such as flash memory) (not shown), which may include one or more types of computer readable medium, which stores related data, such as license-related data, user-related data and so on.

The license management system 100 can perform the license management method of the present invention for managing license usage, which will be discussed further in the following paragraphs. To be more specific, the license management system 100 can perform the license management method of the present invention through the aforementioned permission verification device 110, the license setting device 120, the group-member device 130, the message notification device 140, the grade calculation device 150 and the scheduling device 160 to calculate the grades of the licensed users of all the current license usage devices, comprehensively consider the past use conditions of the groups and each device and the historical records of license usages by groups, based on an algorithm, so as to effectively reflect the fairness of average license usage. Those who with highest rating will release their licenses first, so that the license usage conditions can be adjusted dynamically through the mechanism, to reasonably average the license usage.

Figure 2:
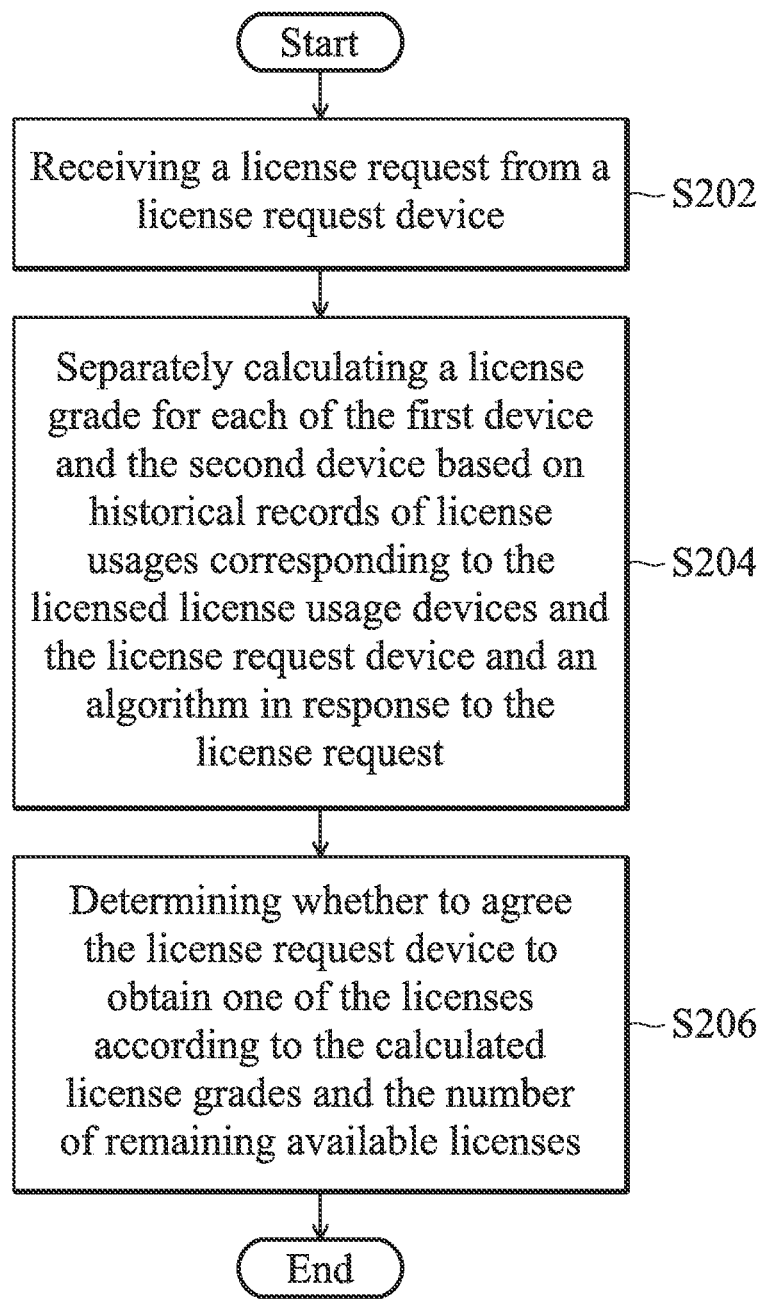
FIG. 2 is a flow chart illustrating a license management method according to an embodiment of the invention.

FIG. 2 is a flowchart of an embodiment of a license management method of the invention. The license management method can be applied to a license management system such as the license management system 100 of FIG. 1, which can be an electronic device, such as a PDA, a smart phone, a mobile phone, an MID, a laptop computer, a car computer, a digital camera, a multi-media player or a game device, or any other type of mobile computational device, however, it is to be understood that the invention is not limited thereto. In this embodiment, it is assumed that the license management system 100 comprises the permission verification device 110, the license setting device 120, the group-member device 130, the message notification device 140, the grade calculation device 150 and the scheduling device 160 and it is coupled to the license server 200 and the data server 300 for performing license management on a given number of licenses in the license pool of the license server 200, in which one or more of licensed license usage devices are using one of the given number of licenses.

First, in step S202, the license management system 100 receives a license request from a license request device, which is used to request to use a license.

Next, in step S204, in response to a license request, the license management system 100 calculates respectively license grades corresponding to multiple licensed license usage device and the license request device according to a historical record of license usage corresponding to the multiple licensed license usage devices and the license request devices and an algorithm through the grade calculation device 150. In some embodiments, through the license setting device 120 and the group-member device 130, the license management system 100 can obtain the historical record of license usage, including one or more of the following information: the time the user of the device spent on using license on the day, the average time the user of the device spent on using license in the current week, the average time the user of the device spent on using license in the current month, the number of licenses being released from the system for the user of the device in the current month, and/or the license rating coefficient of the group that the user of the device belongs to.

After calculating the license grades corresponding to the licensed license usage devices and the license request device respectively, in step S206, the license management system 100 determines, through the scheduling device 160, whether to allow the license request device to obtain one of the licenses according to the license grades and the number of remaining available licenses.

Furthermore, while performing the step S206, the license management system 100 may further perform a permission verification process through the permission verification device 110 to determine whether the license request device has the permission to obtain one of the licenses. When the permission verification device 110 determines that the license request device does not have the permission to obtain one of the licenses, the scheduling device 160 rejects the license request.

In some embodiments, determination of whether the license request device that sends the license request has the permission to obtain one of the licenses may further check one or more of the following conditions: whether the user of the license request device has applied for the license; whether the user of the license request device is configured to be a VIP; whether the total time the user of the device using the license on the day has reached a upper limit; whether the total time the user of the device using the license in the current week has reached a upper limit; and whether the total time the user of the device using the license in the current month has reached a upper limit.

When the permission verification device 110 determines that the license request device has the permission to obtain one of the licenses, the scheduling device 160 further determines whether the number of remaining available licenses is zero. When determining that the number of remaining available license is not zero, the scheduling device 160 accepts the license request, and gives one of the licenses to the license request device. When the scheduling device 160 determines that the number of remaining available licenses is zero, the license management system 100 calculates the license grades corresponding to the first device and the second device through the grade calculation device 150, according to the historical record of license usage and the algorithm, as mentioned above.

When the calculation results indicate that the grade of the license request device is the highest, the scheduling device 160 issues a notice to reject the license request. When the calculation results indicate that the grade of the license request device is not the highest, the scheduling device 160 releases a license from the licensed license usage device with highest grade. In some embodiments, when the scheduling device 160 determines that the number of remaining available licenses is zero, it may further generate a license reservation record corresponding to the license request device, to help the license request device to reserve the use of the license. Detail descriptions on the calculation of the license grades of the licensed license usage devices and the license request device, the relevant algorithms, and how to determine that one of the licenses is given to the license request device according to the license grades and the number of remaining available licenses will be discussed further in the following paragraphs.

Figure 3:
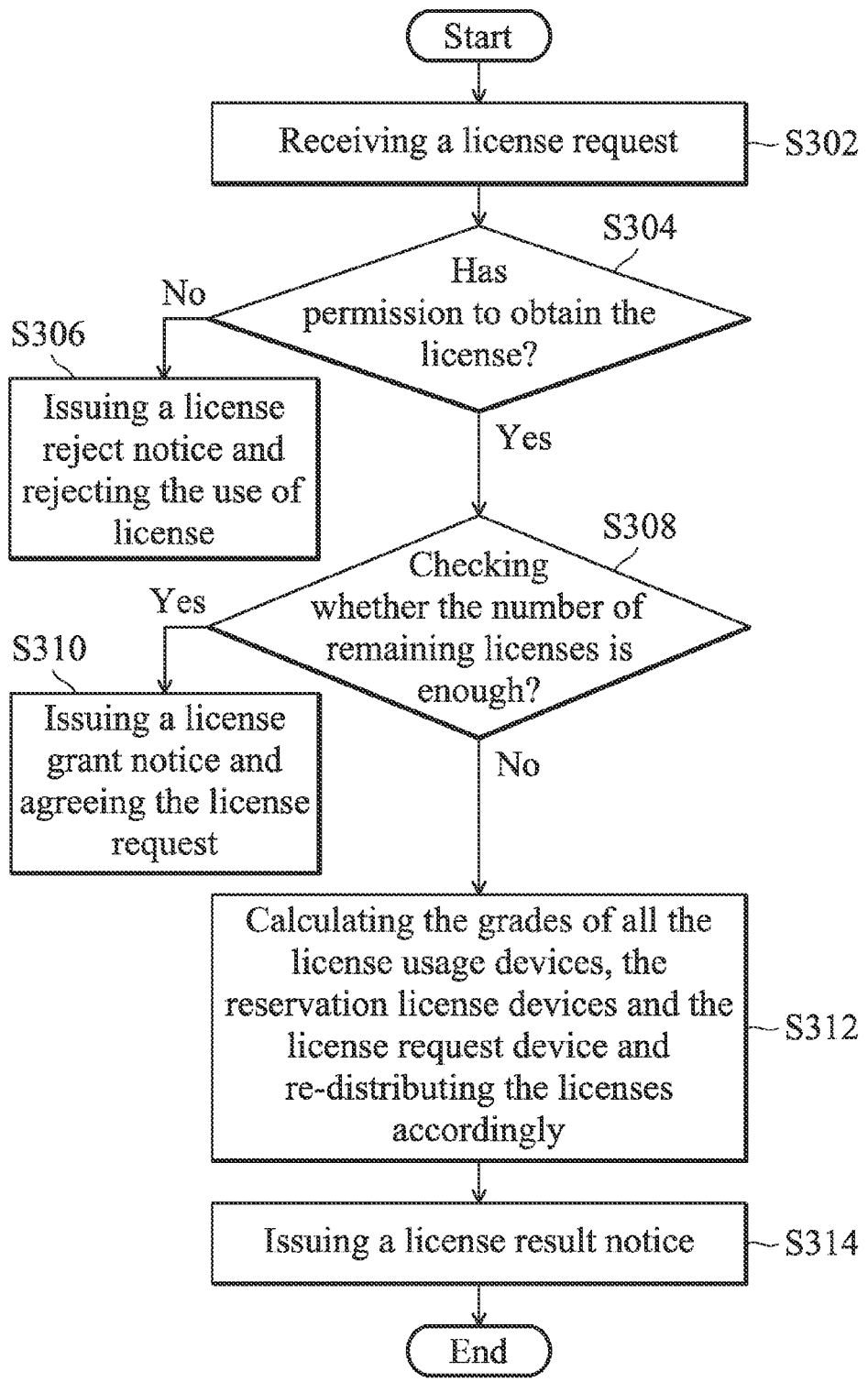
FIG. 3 is a flow chart illustrating a license management method according to another embodiment of the invention.

FIG. 3 is a flowchart of another embodiment of a license management method of the invention. The license management method can be applied to a license management system such as the license management system 100 of FIG. 1, which can be an electronic device, such as a PDA, a smart phone, a mobile phone, an MID, a laptop computer, a car computer, a digital camera, a multi-media player or a game device, or any other type of mobile computational device, however, it is to be understood that the invention is not limited thereto. In this embodiment, it is assumed that the license management system 100 comprises the permission verification device 110, the license setting device 120, the group-member device 130, the message notification device 140, the grade calculation device 150 and the scheduling device 160 and it is coupled to the license server 200 and the data server 300 for performing license management on a given number of licenses in the license pool of the license server 200, in which one or more of first devices (i.e. the license usage devices) are using one of the given number of licenses.

First, in step S302, when a user of a second device (hereinafter referred to as the license requester) opens the software and requests for a license, the second device sends a license request to the license management system 100 and thus the license management system 100 receives a license request from the second device. The second device is also referred to as the license request device. Next, in step S304, the permission of the license request device is checked by the permission verification device 110 to determine whether the user of the second device has the permission to obtain one of the licenses. For example, in some embodiments, the step of checking the permission of the license request device may further check one or more of the following conditions: whether the user of the device has applied for the software license to use this software; whether the user of the device is configured to be a VIP for the software license; whether the total time the user of the device using the software license on the day has reached a upper limit; whether the total time the user of the device using the software license in the current week has reached a upper limit; and whether the total time the user of the device using the software license in the current month has reached a upper limit. The license management system 100 may determine whether the license request device has the permission to obtain one of the licenses according to the aforementioned conditions. When determining that the license request device has no permission to obtain one of the licenses (No in step S304), in step S306, such as when the user of the license request device has never applied for the software license to use the software, the user of the device is not configured to be a VIP for the software license, the total time the user of the license request device using the software license on the day has reached the upper limit, the total time the user of the license request device using the software license in the current week has reached the upper limit or the total time the user of the license request device using the software license in the current month has reached the upper limit, the license management system 100 issues a license reject notice to the license request device through the message notification device 140 and rejects the license request.

Contrarily, when determining that the license request device has the permission to obtain one of the licenses (Yes in step S304), in step S308, such as when the user of the license request device has ever applied for the software license to use the software, the user of the device is configured to be a VIP for the software license, the total time the user of the license request device using the software license on the day has not reached the upper limit, the total time the user of the license request device using the software license in the current week has not reached the upper limit and/or the total time the user of the license request device using the software license in the current month has not reached the upper limit, the license management system 100 further determines whether the number of remaining available licenses is enough. To be more specific, the license management system 100 may check whether the number of remaining available licenses in the license pool is enough to be given so as to determine whether to give the license to the license request device.

When the number of remaining available license in the license pool is still enough (Yes in step S308), in step S310, which means that the license pool has remaining available license to be given to the license request device, the license management system 100 issues a license grant notice to the license request device through the message notification device 140 to accept the license request and gives one of the licenses to the license request device. Therefore, the user of the license request device can obtain the license and starts the use of the software.

In some embodiments, the license grant time may include a valid time period, to indicate the effective retention time for the issued license, for example, when the valid time period is ten minutes, that means the license will last at least ten minutes. When the user of the license request device does not open the software to obtain the license within the valid time period, this license will be expired and be released to other devices that need to use the license. If the user of the license request device opens the software beyond the valid time period, he/she must request a license again and wait for the next license notice. By doing so, the licenses can be utilized more efficiently.

When there is no remaining available license in the license pool (No in step S308), in S312, it means that the license pool does not have enough licenses to give to the license request device and the license management system 100 calculates the grades of all the users of the current license usage devices (not including the users of the license devices whose licenses are waiting to be released), the users of license usage reservation device and the users of the license request device through the group-member device 130 and the grade calculation device 150 and re-distributes the licenses through the scheduling device 160 according to the calculated grades. It is to be noted that when the user of the license request device is configured to be the VIP, it is not necessary for the scheduling device 160 to include them in the re-distribution of the licenses. Note that the calculated grades are associated with the priority order of license usage, the higher the grade are, the lower the priority order of license usage is.

In some embodiments, the rating of each license user can be calculated by an algorithm, so as to obtain their license grades and comprehensively consider the group's overall and individual license usage statuses in each device in the past. A positive correlation is between the grades and the order of license release. The affecting factors in license rating algorithm may include at least one or more of the following statistic data of historical records of license usage:

the time the user of the device spent on using license on the day;

the average time the user of the device spent on using license in the past 7 days (current week);

the average time the user of the device spent on using license in the pastr 30 days (current month);

the number of licenses being released from the system for the user of the device in the past 30 days; and/or the license rating coefficient of the group that the user of the device belong to and so on.

For example, but not limited to, the grade T of the user of a device (including the users of the license request device and the license usage device) can be obtained by the following algorithm:

$$T=(T1*S1+T2*S2+T3*S3-K1*S4)*P(g),$$

in which T1 represents the time the user of the device spent on using license on the day, T2 represents the average time the user spent on using license in the past 7 days, T3 represents the average time the user spent on using license in the past 30 days, K1 represents the number of licenses being released in the past 30 days, S1~S4 are weights, (T1*S1+T2*S2+T3*S3−K1*S4) represents the grade of an individual, and P(g) represents the license rating coefficient of the group that the user of the device belongs to. The sum of weights S1~S4 is 100% (i.e. S1+S2+S3+S4=100%) and the values of the weights S1~S4 can be adjusted according to different license policies. For example, when the license policy is mainly consider the time the user of the device spent on using license on the day, S1 can be set to be 40% while S2~S4 are set to be 20% so as to emphasize the importance of the time the user of the device spent on using license on the day in the grade calculation.

The license rating coefficient P(g) can be determined based on the historical record of license usage time spent by the device users of the whole group. For example, the license rating coefficient P(g) can be defined as below:

$$P(g) = AvT(g) \bigg/ \max_{g=1\sim n} AvT(g),$$

in which AvT(g) represents the average license usage time spent by the device users of group g in the past 30 day, and can be obtained by summing up the average license usage time spent by each device user to find an average value according the historical record of group g. For example, AvT(g) can be defined as below:

$$AvT(g) = \frac{\sum_{1}^{U(g)} T3(i)}{U(g)},$$

in which U(g) represents the number of the device user in the group g, and T3(i) represents the average time the device user i in the group g spent on using license in the past 30 days. In this embodiment, groups and individuals can check their own average usage rate, to learn about the license usage conditions and estimate their opportunity to obtain a license.

Thereafter, in step S314, the license management system 100 uses the license distribution result to issue a result notice to the license request device and/or the license usage devices. For example, the result notice may include at least one license reject notice, an expected license recovery notice, and an expected license grant notice, and the invention is not limited thereto. When the user of the license request device has the highest grade, the license management system 100 issues a reject notice to the license request device to reject license. To be more specific, when the license server is fully loaded (i.e. all licenses are in use and there is no remaining available license), the license management system 100 can calculate average usage rate for the overall and individual device of each group, and release firstly the license of the group and device users with higher usage rate. In one embodiment, when the license server is fully loaded, at this time there is no remaining available license, and existing license device with the highest grade will be the next one to release its license.

When the grade of the license request device is not the highest one, it means one of the current license usage devices is the highest, and the license management system 100 issues an expected license recovery notice to the license usage device with the highest grade, to notify it that its licenses will be released. Meanwhile, the license management system 100 issues an expected license grant notice to the license request device, notify it that its license request is accepted and when it will obtain the license. Therefore, by the license management method of the invention, the users of license request device can know in advance when the license will be given to them, and they can access the software just before the point when the license is given, so as to utilize their time more effectively and reduce unnecessary waiting.

In some embodiments, the license management system 100 may periodically rearrange the license service and perform the license management according to the calculated grades, wherein the expected recovery time for a license is set to be the next time for rearranging the license service. In some embodiments, if the license usage time for the user with the highest grade is not exceeded a threshold value (e.g. an hour), the expected recovery time is set to be the second next time for rearranging the license service and so forth.

In some embodiments, when the license server is fully loaded, the license request device may further perform license reservation by the license reservation record. If there is already another license reservation record for the license request device, one of the two license reservation records with the earlier expected license grant time therebetween will be set as the expected license grant time for the license request device and the other one will be cancelled automatically.

Therefore, with the license management systems and related license management methods of the invention, the group's overall and individual user's average license usage rate of each device can be calculated instantly, to be used to adjust the license usage statuses, so that the license usage can be evenly distributed. Moreover, when the license server is fully loaded, the users can clearly know when they can obtain a license through the license reservation record, so as to be able to adjust their work assignments at hand, and postpone the work that in need of software licenses, thereby effectively utilizing their time. Furthermore, since the time when the license will be released can be calculated by the license management methods of the invention and notified to the users waiting for the released license, they have enough time to prepare for their work, rather than directly release the license, leading to possible loss in their work, thus helping users more effectively plan their work processes and reducing their work losses.

The methods, or certain aspects or portions thereof, may take the form of a program code (i.e., executable instructions) embodied in tangible media, such as floppy diskettes, CD-ROMS, hard drives, or any other non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer-implemented license management method for use in a license management system, wherein the license management system comprises a plurality of licenses and a plurality of first devices, each of which obtaining one of the licenses, the method comprising:

receiving a license request from a second device;

separately calculating a license grade for each of the first devices and the second device based on a historical record of license usage corresponding to the first devices and the second device and an algorithm in response to the license request, wherein the historical record of license usage at least includes information regarding a license rating coefficient of a group that a user of the second device belongs to and the license grades are calculated at least based on the license rating coefficient of the group; and when determining to agree the second device to obtain one of the licenses according to the calculated grades and the number of remaining available licenses within the licenses being zero, setting a first time for one selected from the first devices to release a license and releasing the license of the selected one of the first devices and issuing the released license to be used by the second device after the first time has reached.

2. The license management method of claim 1, further comprising:

performing a permission verification process to determine whether the second device has the permission to obtain one of the licenses; and rejecting the license request when the second device has no permission to obtain one of the licenses.

3. The license management method of claim 2, further comprising:

determining whether the number of the remaining available licenses is zero when the second device has the permission to obtain one of the licenses;

accepting the license request and issuing one of the licenses to the second device when determining that the number of the remaining available licenses is not zero; and calculating the license grades corresponding to the first devices and the second device based on the historical record of license usage and the algorithm when determining that the number of the remaining available licenses is zero.

4. The license management method of claim 3, further comprising:
generating a license reservation record corresponding to the second device for reserving the use of the licenses when determining that the number of the remaining available licenses is zero.

5. The license management method of claim 2, wherein the step of determining whether the second device has the permission to obtain one of the licenses further comprises checking one or more of the following conditions:
whether a user of the second device has applied for the license;
whether the user of the second device is configured to be a VIP;
whether the total time the user of the second device using the license on the day has reached a upper limit;
whether the total time the user of the second device using the license in the current week has reached a upper limit; and
whether the total time the user of the second device using the license in the current month has reached a upper limit.

6. The license management method of claim 1, wherein the historical record of license usage further includes one or more of the following information:
the time a user of the second device spent on using license on the day;
the average time the user of the second device spent on using license in the current week;
the average time the user of the second device spent on using license in the current month;
the number of licenses being released from the license management system for the user of the device in the current month; and/or
the license rating coefficient of the group that the user of the device belongs to.

7. The license management method of claim 1, further comprising:
issuing a license reject notice to reject the license request when the license grade of the second device is the highest grade; and
releasing the license of one of the first devices whose license grade is the highest grade when the license grade of the second device is not the highest grade.

* * * * *